US010030996B2

(12) United States Patent
Vath et al.

(10) Patent No.: US 10,030,996 B2
(45) Date of Patent: Jul. 24, 2018

(54) METHOD FOR DETERMINING A ROTATIONAL ANGLE POSITION AND/OR A ROTATIONAL SPEED

(71) Applicant: Robert Bosch GmbH, Stuttgart (DE)

(72) Inventors: Andreas Vath, Leidersbach (DE); Sebastian Grimm, Wuerzburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 595 days.

(21) Appl. No.: 14/578,397

(22) Filed: Dec. 20, 2014

(65) Prior Publication Data
US 2015/0177022 A1 Jun. 25, 2015

(30) Foreign Application Priority Data
Dec. 23, 2013 (DE) ........................ 10 2013 227 055

(51) Int. Cl.
| G01D 5/12 | (2006.01) |
| G01D 5/244 | (2006.01) |
| G01B 7/30 | (2006.01) |
| G01D 5/26 | (2006.01) |
| G01L 3/02 | (2006.01) |
| G01P 3/36 | (2006.01) |
| G01P 3/44 | (2006.01) |
| G01P 3/481 | (2006.01) |
| B60W 30/16 | (2012.01) |
| B60W 30/18 | (2012.01) |

(Continued)

(52) U.S. Cl.
CPC ................. *G01D 5/12* (2013.01); *G01B 7/30* (2013.01); *G01D 5/24485* (2013.01); *G01D 5/26* (2013.01); *G01L 3/02* (2013.01); *G01P 3/36* (2013.01); *G01P 3/44* (2013.01); *G01P 3/481* (2013.01); *B60W 30/16* (2013.01); *B60W 30/18145* (2013.01); *B60W 30/18154* (2013.01); *F02D 28/00* (2013.01); *F03D 17/00* (2016.05); *F05B 2270/326* (2013.01); *F05B 2270/327* (2013.01); *F05B 2270/809* (2013.01)

(58) Field of Classification Search
USPC ......................................... 702/151
See application file for complete search history.

(56) References Cited

U.S. PATENT DOCUMENTS

2004/0189282 A1* 9/2004 Schmid .................. G01P 13/04
324/166
2008/0067815 A1 3/2008 Suryanarayanan et al.
(Continued)

FOREIGN PATENT DOCUMENTS

DE 10 2011 118 831 A1 5/2013

*Primary Examiner* — Paul D Lee
(74) *Attorney, Agent, or Firm* — Maginot, Moore & Beck LLP

(57) ABSTRACT

A method of determining at least one of a rotational angle position and a rotational speed of a rotating element of a drive train includes arranging at least two sensors in an offset manner in a circumferential direction of the rotating element, recording a measured value indicative of a characteristic of a rotation of the rotating element with each sensor, and determining at least one of a rotational angle position and a rotational speed with reference to the measured values and a distance between the at least two sensors in the circumferential direction.

20 Claims, 3 Drawing Sheets

(51) Int. Cl.
*F02D 28/00* (2006.01)
*F03D 17/00* (2016.01)

(56) References Cited

U.S. PATENT DOCUMENTS

| | | | | |
|---|---|---|---|---|
| 2008/0247872 | A1* | 10/2008 | Akcasu | F03D 3/068 |
| | | | | 416/41 |
| 2008/0303281 | A1* | 12/2008 | Krueger | F03D 7/042 |
| | | | | 290/44 |
| 2011/0142620 | A1* | 6/2011 | Loh | F03D 7/0224 |
| | | | | 416/1 |
| 2011/0267045 | A1* | 11/2011 | Bailer | G01D 5/145 |
| | | | | 324/207.25 |
| 2013/0082713 | A1* | 4/2013 | Bolin | F03D 7/042 |
| | | | | 324/418 |
| 2014/0002065 | A1* | 1/2014 | Gustafsson | G01D 5/2073 |
| | | | | 324/207.25 |
| 2014/0156221 | A1* | 6/2014 | Bertolotti | G01B 21/22 |
| | | | | 702/151 |
| 2015/0052985 | A1* | 2/2015 | Brenner | G01H 1/003 |
| | | | | 73/112.01 |

* cited by examiner

METHOD FOR DETERMINING A ROTATIONAL ANGLE POSITION AND/OR A ROTATIONAL SPEED

This application claims priority under 35 U.S.C. § 119 to patent application no. DE 10 2013 227 055.0, filed on Dec. 23, 2013 in Germany, the disclosure of which is incorporated herein by reference in its entirety.

The present disclosure relates to a method for determining a rotational angle position and/or a rotational speed, in particular for also determining a torsional angle and/or a torque, in a drive train, in particular in an energy generation plant, and to such a drive train.

BACKGROUND

Drive trains consisting of components, for example transmissions, clutches and connecting elements (shafts), are important parts, inter alia, of different electrical energy generation plants, for example wind energy plants, hydroelectric plants etc.

The drive train performs the task of establishing a mechanical connection between a drive (for example a rotor of a wind energy plant) and an output (for example a corresponding generator), via which connection energy is transmitted by means of a rotational movement. Drive train components such as transmissions are used to translate the rotational speed and the torque present at the drive into values which correspond to the operating range of the output. If necessary, clutches are used for separation between the drive and the output and shafts establish the mechanical connection between the components involved. Further components, such as mechanical brakes or the like, may also be integrated in the drive train.

Since the components involved and also the connection of the components are not arbitrarily rigid but rather have a finite stiffness, a movement of the shafts results. The movement of the shafts has a disadvantageous effect on the measurement accuracy.

Even though the present disclosure is primarily described within the scope of this application with respect to wind energy plants, it is not restricted in any way to wind energy plants or devices for generating energy but rather can be used, in principle, in all apparatuses in which torsional vibrations of shafts, axles and the like, in particular also of shafts and axles with interposed transmissions, may arise.

DE 10 2011 118 831 A1 thus describes a method and a measuring system which use angle differences of shafts to calculate a torque which can be used as an input variable for a controller which can be used to damp vibrations in the drive train.

A similar approach is followed in US 2008/0067815, according to which a signal is generated from changes in the generator rotational speed, which signal is used to achieve damping via the generator actuating torque.

The disadvantage of all these solutions can be considered to be the fact that the signal quality for the rotational speed, torque and torsional angle can be determined only with limited accuracy on account of the movement of the shafts with respect to the holder.

It is therefore desirable to specify a possible way of detecting a rotational speed, a torque and/or a torsional angle in drive trains with high accuracy.

SUMMARY

In a method according to the disclosure for determining a rotational angle position and/or a rotational speed in a drive train, in particular in an energy generation plant, in particular a wind energy plant, wherein at least two sensors are arranged in an offset manner in the circumferential direction of a rotating element, a measured value which characterizes the rotation is recorded by a sensor in each case. The rotational angle position and/or the rotational speed is/are determined from the measured values, a distance between the at least two sensors in the circumferential direction being taken into account in the determination. As a result, a movement, in particular a tangential and/or radial movement, of the rotating element in the drive train, in particular under load, is compensated for. It is likewise possible to determine a torsional angle and/or torque. The arrangement which is offset in the circumferential direction makes it possible to compensate for a measured value deviation which arises as a result of the movement since the movement has a different effect in the two offset sensors, that is to say the measured values recorded by the two sensors differ from one another. The deviation can therefore be removed by taking into account the exact offset. A tangential and/or radial movement of the rotating element therefore no longer has an adverse effect on the measurement accuracy. A very accurate value can therefore be obtained.

An exact measurement of the rotational speed and/or torque makes it possible to improve the regulation or control of a wind energy plant in such a manner that the energy yield can be increased and dynamic loads and vibrations are simultaneously actively damped by detecting and recording them. During torque and pitch regulation which, in wind energy plants, usually uses a rotational speed signal from a generator as the input variable, it is possible to dispense with filters and the regulating algorithm can therefore provide the correct desired values for the torque to be set or the pitch angle to be set in a considerably faster manner. It is therefore possible to then react more quickly to unforeseen events and negative consequences can be considerably reduced thereby.

Two of the sensors are preferably arranged in a manner offset by 150° to 210°, in particular by approximately 180°, with respect to one another in the circumferential direction of the rotating element and/or are arranged at (approximately) the same height in the axial direction. As a result of the movement, the deviation is thereby opposite the measured values recorded by the two sensors and can easily be removed since the deviations are also of the same magnitude, in particular.

At least one further sensor is advantageously used to record a measured value of the drive train, the measured value being taken into account when determining the rotational angle position and/or the rotational speed and/or the torsional angle and/or the torque. In particular, this at least one further sensor is arranged in an offset manner with respect to the at least two sensors in the axial direction in this case. The at least one further sensor may likewise comprise two sensors which are arranged in an offset manner in the circumferential direction. Such a further sensor can be used to obtain an additional reference measured value which can be used for improved determination of the rotational angle position and/or the rotational speed or for a general increase in the measurement accuracy. Alternatively, such a further sensor can also be used to obtain an additional measured value which can be used to calculate the torsional angle and/or the torque.

It is also advantageous if the at least one further sensor records a measured value on another element of the drive train which rotates more quickly than the at least two sensors. For this purpose, the further sensor is arranged downstream of a transmission, in particular, whereas the at least two sensors are arranged upstream of the transmission. The compensation for the measured values from the at least two sensors can therefore be calculated by an element which has been moved to a greater extent, as is the case on the rotor side in a wind energy plant for example, and the reference measured value can be calculated by an element which has not been moved or has been moved only slightly, as is usually the case on the generator side.

Four sensors which each record a measured value of the rotating element of the drive train are preferably used, two of the four sensors being arranged in an offset manner with respect to one another in the circumferential direction. The use of two pairs of sensors to compensate for the measured values makes it possible to further increase the measurement accuracy. In particular, the two pairs of sensors may also record measured values in different radial directions, however, as a result of which compensation for a plurality of movement directions, for example directions which are perpendicular to one another, can be taken into account.

The measured values are advantageously recorded by the sensors using a signal tape, in particular having markings, or at a gearwheel, in particular of a transmission. A signal tape having markings, for example a metal tape having holes or ferromagnetic elements or colored markings, can be very easily fitted to a rotating element, in particular a shaft in an energy generation plant. Retrofitting is therefore also possible in a particularly simple manner. The corresponding sensors can then be fitted such that the markings on the signal tape can be detected. For this purpose, the sensors have a corresponding detection unit, for example an inductive or optical detection unit. In this case, the measured signal is a pulse sequence, for example a square-wave pulse sequence, from which a rotational speed and/or a rotational angle position can be determined in a known manner.

A computing unit according to the disclosure, for example a control device of a wind energy plant, is set up, in particular in terms of programming, to carry out a method according to the disclosure.

The implementation of the disclosure in the form of software is also advantageous since this enables particularly low costs, in particular if an executing computing unit is also used for further tasks and is therefore present anyway. Suitable data storage media for providing the computer program are, in particular, floppy disks, hard disks, flash memories, EEPROMs, CD-ROMs, DVDs and many more. It is also possible to download a program via computer networks (Internet, intranet, etc.).

A drive train according to the disclosure having a rotating element, in particular having a signal tape and/or a gearwheel, has at least two sensors which are arranged in an offset manner in the circumferential direction on the rotating element and are set up to each record a measured value of the rotating element in order to determine a rotational angle and/or a rotational speed. Such a drive train, in particular in an energy generation plant, in particular a wind energy plant, can be used to carry out a method according to the disclosure.

Further advantages and refinements of the disclosure emerge from the description and the accompanying drawing.

It goes without saying that the features mentioned above and the features yet to be explained below can be used not only in the respectively stated combination but also in other combinations or alone without departing from the scope of the present disclosure.

BRIEF DESCRIPTION OF THE DRAWINGS

The disclosure is schematically illustrated in the drawing using exemplary embodiments and is described in detail below with reference to the drawing.

DETAILED DESCRIPTION

Figure 1:
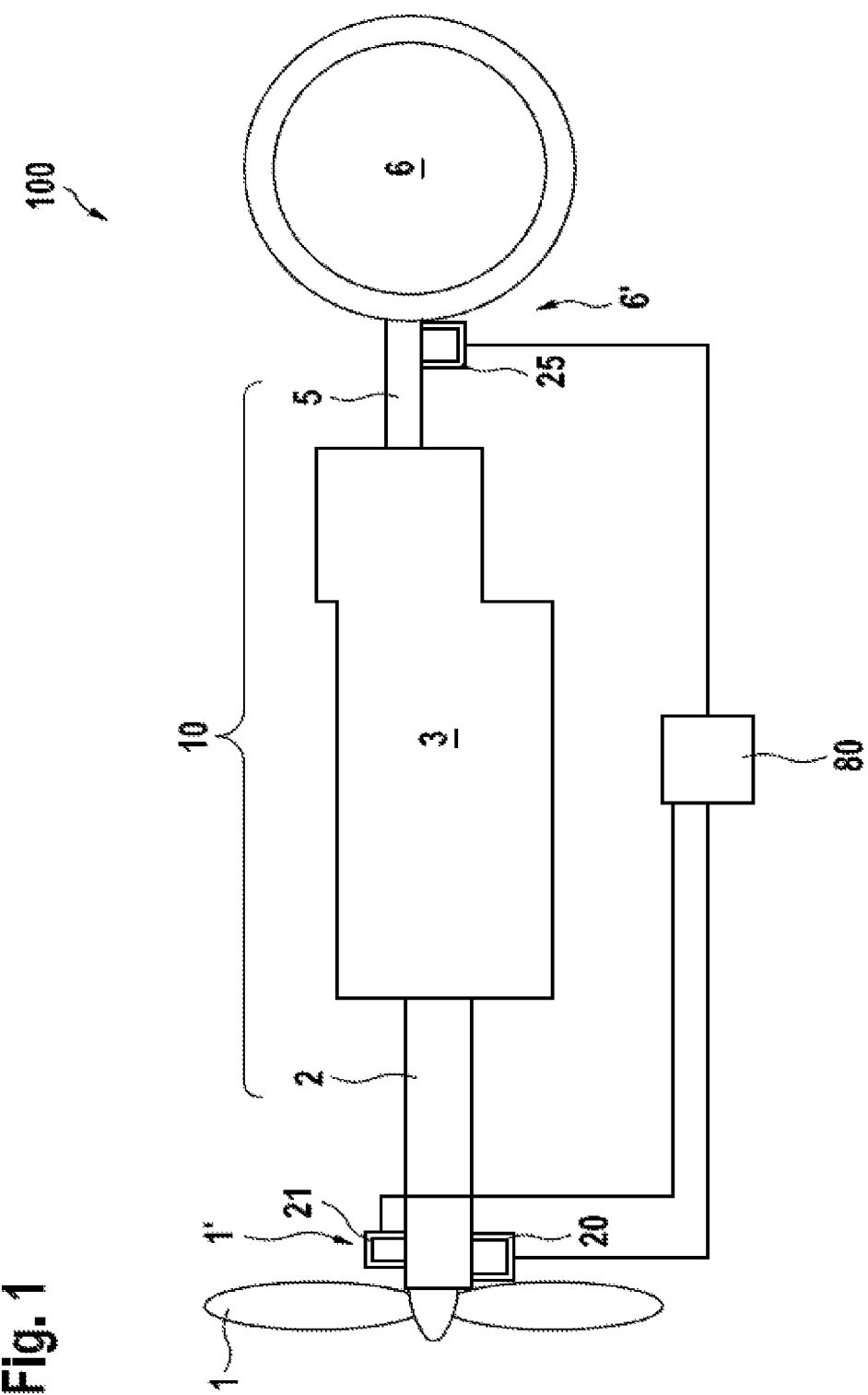
FIG. 1 schematically shows a wind energy plant for carrying out a method according to the disclosure in one preferred refinement.

FIG. 1 schematically illustrates a wind energy plant 100. In the center, the wind energy plant 100 has a drive train 10 which in turn has a transmission 3 having a rotating element in the form of a shaft 2 on the rotor side and a rotating element in the form of a shaft 5 on the generator side. The transmission 3 means that the rotational speeds of the shafts 2 and 5 are different; in particular, the shaft 5 rotates more quickly than the shaft 2 during operation of the wind energy plant 100.

The wind energy plant 100 also comprises a rotor 1 at the rotor-side end 1' of the drive train 10 and a generator 6 at the generator-side end 6' of the drive train 10. A rotational movement of the rotor 1 is therefore transmitted to the generator 6 by the drive train 10.

At the rotor-side end 1', two sensors 20, 21 which are offset by 180° with respect to one another in the circumferential direction are arranged on the shaft 2. A further sensor 25 is arranged on the shaft 5 at the generator-side end 6'. The sensors 20, 21, 25 are connected to a computing unit 80 which is used to process the measured values recorded by the sensors 20, 21, 25, for example a rotational speed. In particular, a movement of the shaft 2 in the radial direction is compensated for in the computing unit 80. In this case, an average value of the measured values recorded by the two sensors 20, 21 is formed.

The measured value from the further sensor 25 can be used, in particular, to determine a torque by determining torsion or a torsional angle along an axial direction of the drive train 10, that is to say between the rotor-side end 1' and the generator-side end 6'. A torque can therefore be inferred using the torsional angle and a torsional modulus which is known or can be determined. In this case, a transmission ratio of the transmission 3 for the rotational speed or rotation should be taken into account.

Figure 2:
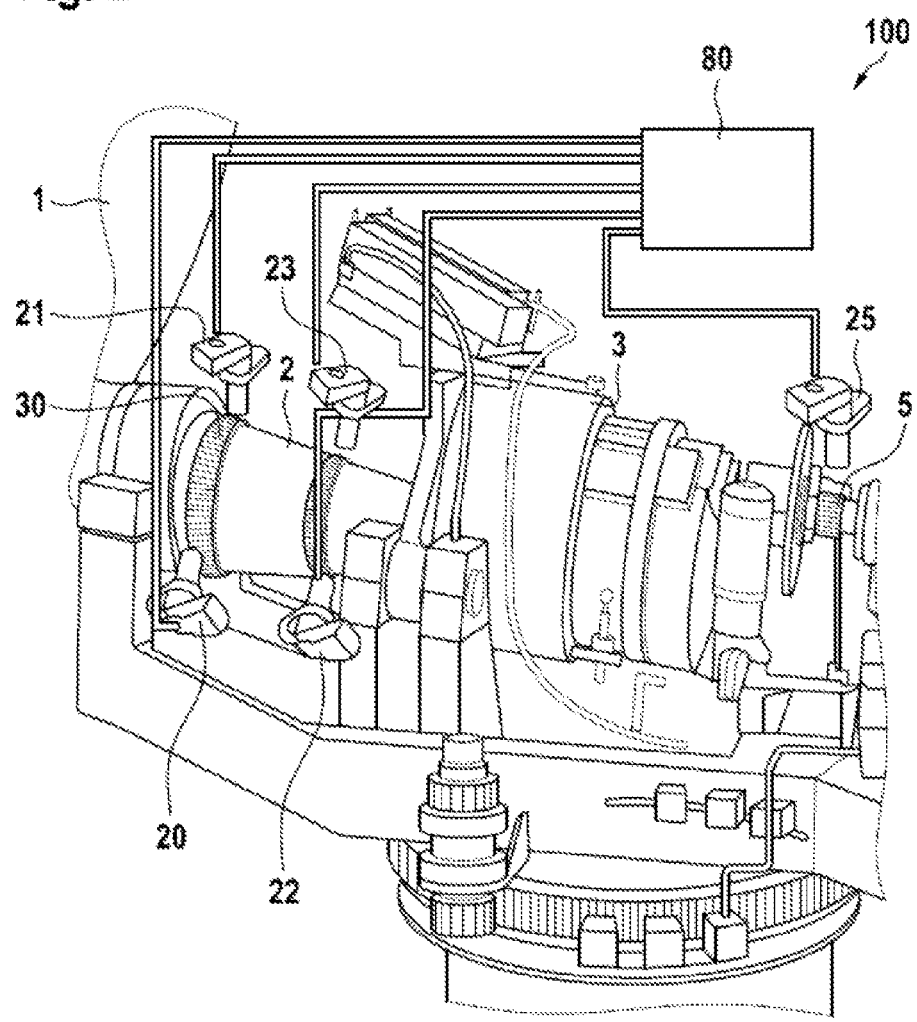
FIG. 2 schematically shows a drive train of a wind energy plant for carrying out a method according to the disclosure in one preferred refinement.

FIG. 2 likewise illustrates a wind energy plant 100. The latter again has a transmission 3 having a rotating element in the form of a shaft 2 on the rotor side and a rotating element in the form of a shaft 5 on the generator side. The transmission 3 means that the rotational speeds of the shafts 2 and 5 are different; in particular, the shaft 5 rotates more quickly than the shaft 2 during operation of the wind energy plant 100. The shafts 2, 5 and the transmission together form the drive train.

The wind energy plant 100 also comprises a rotor 1 at the rotor-side end of the drive train and a generator (which is not illustrated here however) at the generator-side end of the drive train. A rotational movement of the rotor 1 is therefore transmitted to the generator by the drive train.

At the rotor-side end, four sensors 20, 21, 22, 23 are arranged on the shaft 2, the sensors 20, 21 and the sensors 22, 23 respectively being offset by 180° with respect to one another in the circumferential direction. The pairs of sensors 20, 21 and 22, 23 are likewise offset in the axial direction. A further sensor 25 is arranged on the shaft 5 at the generator-side end.

The sensors 20, 21, 22, 23, 25 are connected to a computing unit 80 which is used to process the measured values recorded by the sensors 20, 21, 22, 23, 25, for example a rotational speed. In particular, a movement of the shaft 2 in the radial direction is compensated for in the computing unit 80. In this case, an average value of the measured values recorded by the two sensors 20, 21 is formed. The same applies to the sensors 22, 23, in which case the accuracy of the rotational speed determined is increased by the additional measured values. For this purpose, it is respectively possible to carry out averaging across the sensors 20, 21 and 22, 23, for example, and then across these two averaging operations. A plurality of radial movements, in particular movements which are perpendicular to one another, can be taken into account in this case.

Signal tapes, one of which is denoted with 30 by way of example on the shaft 2, are also fitted to the shafts 2, 5. Such a signal tape having markings, for example a metal tape with holes, elevations or magnetic elements, makes it possible to record the rotational speed of the shaft 2 using the sensors 20, 21. It is also possible to retrofit such a signal tape in existing drive trains of wind energy plants in a particularly simple manner since the signal tape must only be placed around the shaft and fastened. The corresponding sensors, for example the sensors 20, 21, can be accordingly fitted so that they can be used to detect a rotation of the signal tape.

Figure 3:
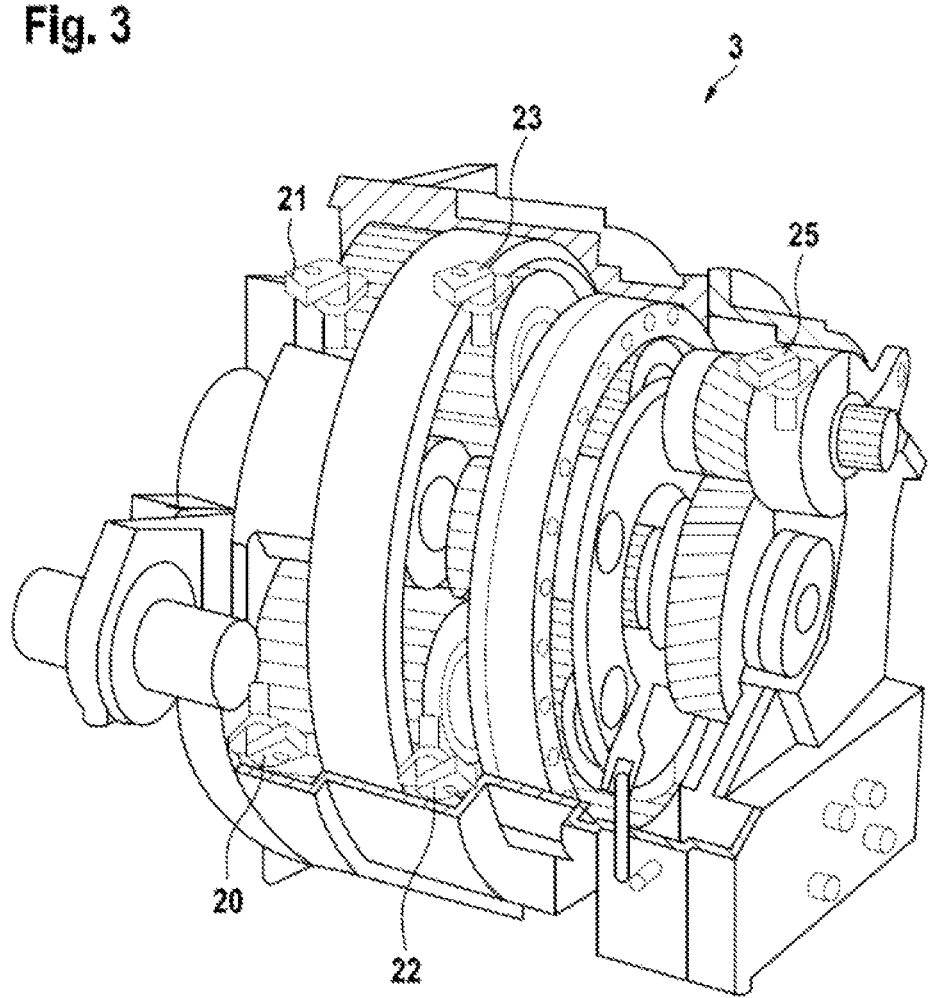
FIG. 3 schematically shows a transmission for carrying out a method according to the disclosure in one preferred refinement.

FIG. 3 illustrates a transmission 3 of a drive train. Sensors 20, 21, 22, 23, 25 which are used in the manner described in FIGS. 1 and 2 are schematically illustrated on the transmission 3. However, the difference here is that the sensors are not arranged on shafts but rather on or in the transmission.

The measured values can be recorded here, for example, by detecting the teeth of the rotating gearwheels. The sensors again record different rotational speeds since they are arranged on elements which rotate at different speeds.

What is claimed is:

1. A method of improving operation of a drive train, comprising:
    measuring, with each of a first sensor and a second sensor, a respective first measured value and a second measured value indicative of a characteristic of a rotation of a rotating element of the drive train, the first and second sensors being offset relative to one another in a circumferential direction of the rotating element;
    determining at least one of a rotational angle position and rotational speed of the rotating element by compensating for at least one of a radial movement and a tangential movement of the rotating element relative to a nominal axis of the rotating element based on the first measured value, the second measured value, and a distance between the first and second sensors in the circumferential direction; and
    damping vibrations on the drive train on the basis of the determined at least one of the rotational angle position and rotational speed of the rotating element.

2. The method according to claim 1, further comprising determining at least one of (i) a torsional angle and (ii) a torque with reference to the first and second measured values, the first and second measured values each corresponding to one of a rotational angle position value and a rotational speed value.

3. The method according to claim 1, wherein:
    the first and second sensors are offset from each other by an angle in the circumferential direction in a range from 150° to 210° measured about the nominal axis; and
    the first and second sensors are at approximately a same location in an axial direction defined along the nominal axis.

4. The method according to claim 3, wherein the at least one rotational angle position and rotational speed is determined via at least one of a calculation rule and an averaging.

5. The method according to claim 1, further comprising:
    recording, via a third sensor, a third measured value that is indicative of a characteristic of the rotation of the rotating element,
    wherein the determination of the at least one rotational angle position and rotational speed is based on the third measured value.

6. The method according to claim 5, further comprising:
    arranging the third sensor in an offset manner in an axial direction with respect to the first and second sensors, the axial direction defined along the nominal axis.

7. The method according to claim 6, further comprising determining at least one of (i) a torsional angle and (ii) a torque with reference to the third measured value and the first and second measured values, the first and second measured values each corresponding to one of a rotational angle position value and a rotational speed value.

8. The method according to claim 6, wherein:
    the third sensor is arranged on an element of the drive train, which includes a transmission; and
    the element is configured to rotate at a faster rate than the rotating element.

9. The method according to claim 1, further comprising:
    recording, via each of a third sensor and a fourth sensor, respective third and fourth measured values that are indicative of a characteristic of the rotation of the rotating element.

10. The method according to claim 1, wherein the first and second sensors are each configured to record the respective first and second measured values using a signal tape or a gear wheel on the rotating element.

11. The method according to claim 1, wherein the first and second sensors are each configured to record the respective first and second measured values using a signal tape that includes markings.

12. The method according to claim 1, wherein the drive train is a drive train of an energy generation plant.

13. The method according to claim 1, wherein:
    the first measured value is a first measured rotational speed of the rotating element;
    the second measured value is a second measured rotational speed of the rotating element; and
    the compensating for the at least one of the radial movement and the tangential movement of the rotating element is based on a difference between the first and second measured rotational speeds and the distance between the first and second sensors in the circumferential direction.

14. An energy generation plant, comprising:
    a drive train including a rotating element having a nominal axis;
    a first sensor configured to measure a first measured value of the rotating element;
    a second sensor offset relative to the first sensor by a distance in a circumferential direction of the rotating element, the second sensor configured to measure a second measured value of the rotating element; and
    a computing device configured to receive the first and second measured values and determine at least one of a rotational angle and a rotational speed of the rotating element by compensating for at least one of a radial movement and a tangential movement of the rotating element relative to the nominal axis based on the first measured value, the second measured value, and the distance; and wherein the computing device is further configured to regulate torque and pitch of the energy generation based on the determined at least one of the rotational angle position and rotational speed of the rotating element.

15. The energy generation plant according to claim 14, the rotating element including at least one of a signal tape and a gearwheel.

16. The energy generation plant according to claim 14, wherein:

the first measured value is a first measured rotational speed of the rotating element;

the second measured value is a second measured rotational speed of the rotating element; and the computing device is configured such that the compensating for the at least one of the radial movement and the tangential movement of the rotating element is based on a difference between the first and second measured rotational speeds and the distance between the first and second sensors in the circumferential direction.

17. A method of improving operation of a drive train, comprising:

measuring, with each of a first sensor and a second sensor, a respective first measured value and a second measured value indicative of a characteristic of a rotation of a rotating element of the drive train, the first and second sensors being offset relative to one another in a circumferential direction of the rotating element;

determining at least one of a rotational angle position and rotational speed of the rotating element by compensating for at least one of a radial movement and a tangential movement of the rotating element relative to a nominal axis of the rotating element based on the first measured value, the second measured value, and a distance between the first and second sensors in the circumferential direction; and regulating torque and pitch of a wind energy plant in which the drive train is installed based on the determined at least one of the rotational angle position and rotational speed of the rotating element.

18. The method according to claim 17, further comprising determining at least one of (i) a torsional angle and (ii) a torque with reference to the first and second measured values, the first and second measured values each corresponding to one of a rotational angle position value and a rotational speed value.

19. The method according to claim 17, wherein:

the first and second sensors are offset from each other by an angle in the circumferential direction in a range from 150° to 210° measured about the nominal axis; and the first and second sensors are at approximately a same location in an axial direction defined along the nominal axis.

20. The method according to claim 17, further comprising:

recording, via a third sensor, a third measured value that is indicative of a characteristic of the rotation of the rotating element, wherein the determination of the at least one rotational angle position and rotational speed is based on the third measured value.

* * * * *